(12) United States Patent
Koharagi et al.

(10) Patent No.: US 6,376,958 B1
(45) Date of Patent: Apr. 23, 2002

(54) PERMANENT MAGNET TYPE SYNCHRONOUS MOTOR AND AIR COMPRESSOR

(75) Inventors: Haruo Koharagi, Juo; Tsukasa Taniguchi, Hitachi; Kouki Yamamoto, Hitachinaka; Satoshi Kikuchi; Miyoshi Takahashi, both of Hitachi; Haruo Miura, Chiyoda; Yasuo Fukushima, Moriya; Masaharu Senoh, Narashino, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/635,216

(22) Filed: Aug. 10, 2000

(30) Foreign Application Priority Data

Aug. 12, 1999 (JP) .............................. 11-228248

(51) Int. Cl.$^7$ .............................. H02K 47/30
(52) U.S. Cl. .............. 310/162; 310/156.08; 310/156.15
(58) Field of Search .................. 310/156.01, 162, 310/156.08, 156.11, 156.12, 156.13, 156.15, 156.23, 156.28, 156.31, 156.51, 156.79, 68 D, 42–45

(56) References Cited

U.S. PATENT DOCUMENTS

| | | | |
|---|---|---|---|
| 4,176,607 A | * 12/1979 | Kishi et al. | 102/49.3 |
| 4,633,113 A | * 12/1986 | Patel | 310/156 |
| 4,729,160 A | * 3/1988 | Brown | 29/598 |
| 4,742,259 A | * 5/1988 | Shaefer et al. | 310/156 |
| 4,827,170 A | * 5/1989 | Kawamura et al. | 310/156 |
| 4,910,861 A | * 3/1990 | Dohogne | 29/598 |
| 4,958,708 A | * 9/1990 | Kawamura | 192/98 |
| 6,144,130 A | * 11/2000 | Kawamura | 310/156 |

FOREIGN PATENT DOCUMENTS

| | | |
|---|---|---|
| JP | 10-243586 | 9/1998 |
| JP | 10-248186 | 9/1998 |

* cited by examiner

Primary Examiner—Nestor Ramirez
Assistant Examiner—Thanh Lam
(74) Attorney, Agent, or Firm—Antonelli, Terry, Stout & Kraus, LLP

(57) ABSTRACT

Provided are a super-high speed permanent magnet type synchronous motor which causes less loss in a rotor even though it is driven by an inverter adapted to be operated with a fundamental frequency around 1 kHz, and an air compressor. The air compressor having a super-high speed permanent magnet type synchronous motor which is composed of a stator in which armature windings are wound in a plurality of slots formed in a stator core, and a rotor including a shaft made of a conductive magnetic material, a conductive permanent magnet laid around the outer periphery of the shaft, and a reinforcing member made of carbon fibers and laid around the outer periphery of the permanent magnet, wherein a laminated electromagnetic steel sheet is interposed between the shaft and the permanent magnet, and the laminated electromagnetic steel sheet has a high tensile strength higher than 70 kg/mm$^2$.

24 Claims, 6 Drawing Sheets

PERMANENT MAGNET TYPE SYNCHRONOUS MOTOR AND AIR COMPRESSOR

BACKGROUND OF THE INVENTION

1. Field of the Invention

The present invention relates to a permanent magnet type synchronous motor used as a super high-speed variable speed motor for driving a compressor or the like, and also relates to a compressor using thereof.

2. Related Art

Permanent magnet type synchronous motors have been prosperously used for industrial drive sources since its motor efficiency is high. If the rotational speed of the motor is low, permanent magnets are directly bonded to the shaft thereof, but the permanent magnets would be fragmented and scattered if the rotational speed of the motor is high.

As measures for eliminating the above-mentioned disadvantages, there has been provided a super-high speed permanent magnet type synchronous motor, in which carbon fibers or titanium rings are used surrounding around permanent magnets, as disclosed in Japanese Laid-Open Patent No. H10-243586 (prior art 1).

Further, a rotor structure used in a high speed generator is composed of a nonmagnetic porous cylindrical member formed therein with air pores and formed around the outer periphery of a shaft, a laminated electromagnetic steel sheet, segmented magnets, and a reinforcing member made of carbon fibers or the like, which are stacked one upon another in the mentioned order, around the shaft, is disclosed in Japanese Laid-Open Patent No. H10-248186 (prior art 2).

In the above-mentioned prior art 1, although the permanent magnets can be prevented from being fragmented and scattered, but no consideration has not yet been made for a problem of loss caused in the rotor when the permanent magnet type synchronous motor is driven by an inverter so as to cause pulsating magnetic flux, due to harmonic current, to be induced in the rotor.

In the above-mentioned prior art 2, the permanent magnets are thermally demagnetized due to a copper loss or an iron loss of the generator, and accordingly, a rotor structure for cooling the rotor itself with air has been proposed in order to prevent thermal demagnetization of the rotor. However, since the output power of the generator rotated at a high speed, inevitably has a high frequency, no consideration is made for a loss induced in the rotor when pulsating magnetic flux caused by high frequency current is induced in the rotor in such a case that an inverter for converting high frequency power into a power having 50 Hz or 60 Hz is added. Further, it has been arranged in such a way that the main magnetic flux of the permanent magnets is led through the laminated electromagnetic steel sheets, and no consideration has not yet been made to such a problem that the allowable speed is restrained by the mechanical strength of the laminated electromagnetic steel sheets themselves.

BRIEF SUMMARY OF THE INVENTION

The present invention is devised in view of the above-mentioned points, and accordingly, an object of the present invention is to provide a permanent magnet type synchronous motor in which less loss is induced in a rotor even though it is driven by an inverter which is operated at a basic frequency of around 1 kHz, and an air compressor using the magnetic type synchronous motor.

To the end according to the present invention, there is provided a permanent type synchronous motor is composed of a stator in which armature windings are wound in a plurality of slots in a stator core, conductive permanent magnets which are provided around the outer periphery of a magnetic shaft, and a rotor provided therearound with a reinforcing member made of carbon fibers, wherein a laminated electromagnet steel sheet is interposed between the shaft and the permanent magnets, and the laminated electromagnetic steel sheet is a high tensile strength electromagnetic steel sheet, and further, there is provided an air compressor using the permanent type synchronous motor.

The magnetic flux from the permanent magnets is led to the stator through the laminated electromagnetic steel sheet and the shaft of the rotor. Further, when the permanent magnet type motor is driven by an inverter having a basic frequency of around 1 kHz, harmonic magnetic flux is induced, being caused by harmonic current from the inverter. This harmonic wave has a frequency which is 5, 7, 11, 13, 17 or 19 times as high as the basic frequency, and accordingly, harmonic loss would be caused in several components. The largest harmonic loss is induced from the shaft with no laminated electromagnetic steel sheet, which would be as high as several kW, and accordingly, a super-high speed permanent magnetic type synchronous motor is not available. However, with the provision of the laminated electromagnetic steel sheet between the shaft and the permanent magnets, as in the present invention, since the harmonic magnetic flux passes through the laminated electromagnetic steel sheet, bypassing the shaft, no shaft loss is caused, and accordingly, the loss can be decreased down to several hundreds W corresponding to iron loss of the laminated electromagnetic steel sheet.

Further, a permanent magnet type synchronous motor having a peripheral speed of a rotor as high as several hundreds m/s, for directly driving an air compressor would cause such a disadvantage that a laminated electromagnet steel sheet provided in the rotor would be deformed by elongation due to centrifugal force. On the contrary according to the present invention, the high tension type electromagnetic steel sheet is desirably used in the rotor. For example, an electromagnetic steel sheet having a tensile strength of 70 kg/mm$^2$ is used, no deformation of the laminated electromagnetic steel plate due to elongation is caused, and accordingly, there can be provided a super-high speed permanent magnet type synchronous motor and an air compressor using thereof.

BRIEF DESCRIPTION OF SERVERAL VIEWS OF THE DRAWING

DESCRIPTION OF THE PREFERRED EMBODIMENTS OF THE INVENTION

Explanation will be made of the present invention in the form of preferred embodiments with reference to FIGS. 1 to 6.

Figure 1:
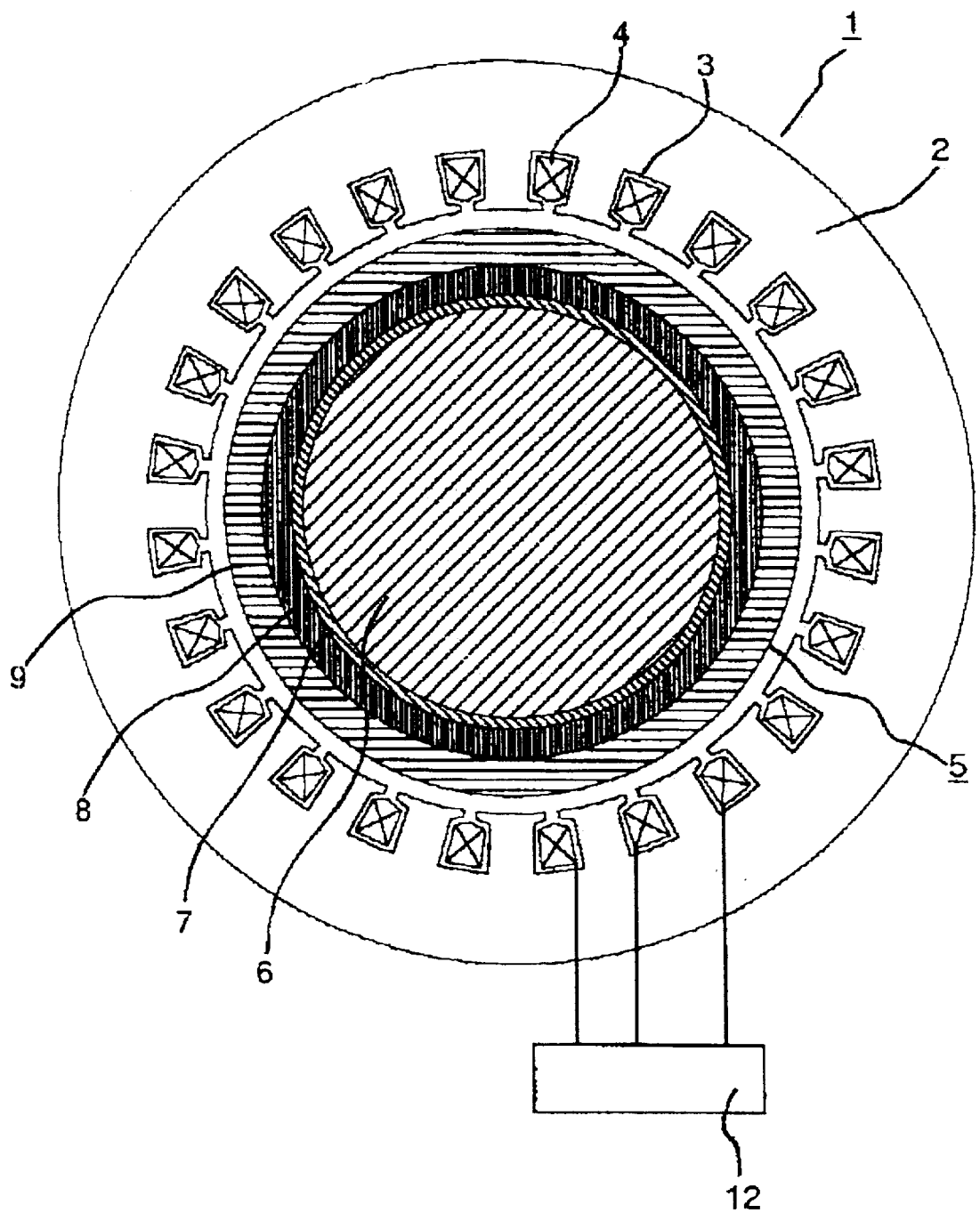
FIG. 1 is a radially sectional view illustrating a permanent magnet type synchronous motor in an embodiment of the present invention.
Figure 2:
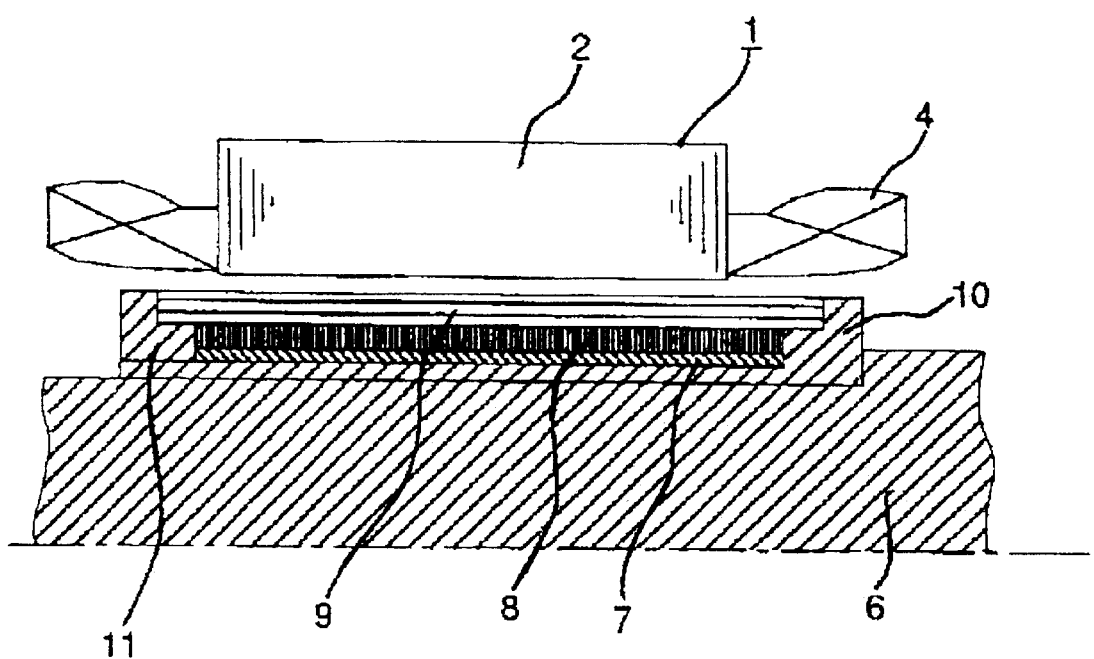
FIG. 2 is a axially sectional view illustrating the permanent magnet type synchronous motor shown in FIG. 1.

Referring to FIG. 1 which is a radially sectional view illustrating an essential part of a permanent magnet type synchronous motor in an embodiment of the present invention, and FIG. 2 which is an axially sectional view illustrating the permanent magnet type synchronous motor in the embodiment of the present invention, a stator is composed of an stationary core 2 formed therein with a plurality slots 3, and three phase u, v, w armature windings 4 wound in the slots 3.

A rotor is composed of a shaft 6 made of conductive magnetic materials, an intermediate sleeve 10 made of the same material as that of the shaft 6, and surrounding around the outer periphery of the shaft 6, a high tensile strength laminated electromagnetic steel sheet 7 surrounding around the outer periphery of the intermediate sleeve 10, a conductive permanent magnet 8 surrounding the outer periphery of the intermediate sleeve 10, and a reinforcing member CFRP 9 made of conductive carbon fibers, and surrounding the outer peripheries of the permanent magnet 8. The rotor 5 is formed by arranging and assembling the high tensile strength laminated electromagnetic steel sheet 7, the permanent magnet 8 and the CFRP 9 around the outer periphery of the intermediate sleeve 10, in the mentioned order, and after the rotor 5 is secured to the end parts of the intermediate sleeve 10 by sealing materials 10, the permanent magnet 8 is magnetized. Then, it is mounted on the shaft 6. The permanent magnet type synchronous motor 1 composed of the stator and the rotor 5 is driven for rotation by supplying current from an inverter 12 to the armature windings in accordance with positions of magnetic poles of the permanent magnet 8.

It is noted that harmonic current fed from the inverter would causes a problem. The permanent magnet type synchronous motor according to the present invention is used for driving an impeller in an air compressor or the like, at a speed higher than 40,000 rpm., that is, it is a super-high speed motor. In view of a drive frequency of the inverter, it is desirable to use a two-pole motor. In the case of the two-pole motor, the drive frequency becomes higher than 667 Hz. Current fed from the inverter having a drive frequency higher than 667 Hz is adjusted through PWM for applied voltage, and accordingly, harmonic waves are superposed. The frequency analysis shows the harmonic frequencies which are 5 times, 7 times, 11 times, 13 times, 17 times and 19 times as high as the fundamental frequency are superposed. These odd order current components cause harmonic magnetic flux to enter the rotor side. Since there are presented the conductive permanent magnet and the shaft (intermediate sleeve), current runs so as to cancel out these harmonic flux in order to cause eddy current loss. The total eddy current loss in the rotor is the sum of eddy current losses caused by the harmonic components, which comes up to 5 kW in the case of measurements with a rotor having an output of 180 kW. Thus, no super-high speed permanent magnet type synchronous motor is available. That is, the lose causes the magnet to increase their temperature so as to decrease their effective magnetic flux, that is a desired output power cannot be obtained. After various experiments, it was found that the loss caused by harmonic magnetic flux, consists of 10% by the permanent magnets 8 and 90% by the intermediate sleeve 10.

On the contrary, according to the present invention, since the laminated electromagnetic steel sheet 7 is provided around the intermediate sleeve 10, the harmonic flux runs, bypassing the laminated electromagnetic steel sheet 7, and accordingly, no loss is caused in the intermediate sleeve 10. Thus, the loss can be reduced down to the sum of 10% by the permanent magnets 8 and several % of iron loss by the high tensile strength laminated electromagnetic steel sheet 7. That is, it was experimentally confirmed that the loss in by the rotor becomes up to several hundreds W in total. The total loss by the rotor is also affected by a content rate of harmonic current from the inverter, and accordingly, in order to reduce the content rate of the harmonic current, a 180 deg. energizing inverter is desirably used. With this arrangement, the temperature rise of the permanent magnets 8 can be reduced so as to obtain effective magnetic flux, thereby a super-high speed permanent magnet type synchronous motor is available.

It is desirably to consider an elongation caused by a centrifugal force in the case of application of the laminated electromagnetic steel sheet in the super-high speed permanent magnet type synchronous motor.

Figure 3:
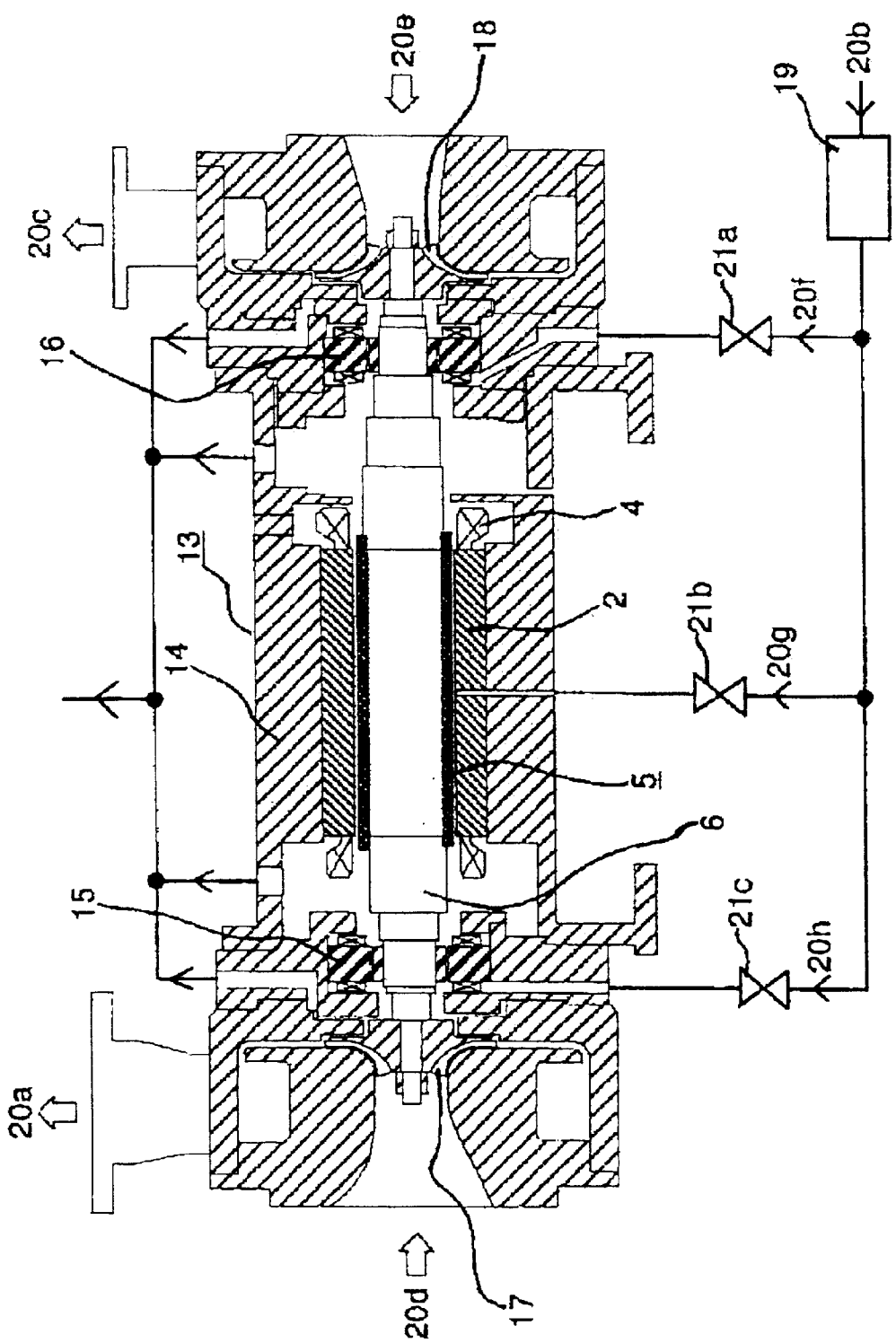
FIG. 3 is an air compressor in an embodiment of the present invention.

FIG. 3 shows an example in which the super-high speed permanent magnet type synchronous motor in the above-mentioned embodiment of the present invention is used in an air compressor 13. In this arrangement, the a shaft 6 is journalled and held by magnetic bearings 15, 16 within a frame 14 (including all accommodation frames), and the rotor 5 (composed of the intermediate sleeve 10, the permanent magnets 8, the CFRP 9 and the sealing materials 11, as shown in FIG. 2) is fitted on the shaft 6 while the stator core 2 in which the armature windings 4 are incorporated is accommodated in the frame 14 is accommodated.

During air compression stroke, air 20d is compressed by an impeller 17 as a first stage compression stage, provided in one end of the shaft 6, and accordingly, air 20a is discharged. Air 20b which is a part of the air 20a is introduced into an intermediate cooler 19 for cooling, and thus cooled air 20h is led through a valve 21c so as to cool the magnetic bearing 15 while cooled air 20g is led through the valve 21b so as to cool the permanent magnet type synchronous motor 1. Further, cooled air 20a is led through a valve 21a so as to cool the magnetic bearing 16. As indicated by the arrow in the upper part of FIG. 3, these cooling airs are collected and discharged. An impeller 18 which is a second compression stage further compresses air 20e (the compressed air on the first compression stage is composed of the air 20e and the air 20b), which has been compressed by the impeller 17 which is the first compression stage, that is, and discharges air 20c which becomes the output of the air compressor 13.

It is noted here that using the air which is the output of the air compressor as cooling air for the permanent magnet type synchronous motor 1 is important. The armature windings 4 in the permanent magnet type synchronous motor can be cooled by the air 20g which directly cooled, but the cooling efficiency of the rotor 4 is low because an air layer which is rotated at a super high speed is present around the outer periphery of the rotor 5 since the permanent magnet type synchronous motor 1 is rotated also at the super-high speed, and accordingly, generated heat can hardly be captured from the rotor 5 even though the cooling air 20g is blown onto the rotor 5. Accordingly, the volume the cooling air 20 should be increased as the loss caused by the rotor 5 becomes as high as several tens kW. Thus, the efficiency of the air compressor becomes lower.

The present invention is devised in view of the above-mentioned problems, and is to provide an arrangement in which loss caused by the rotor is reduced through various experiments.

Figure 4A:
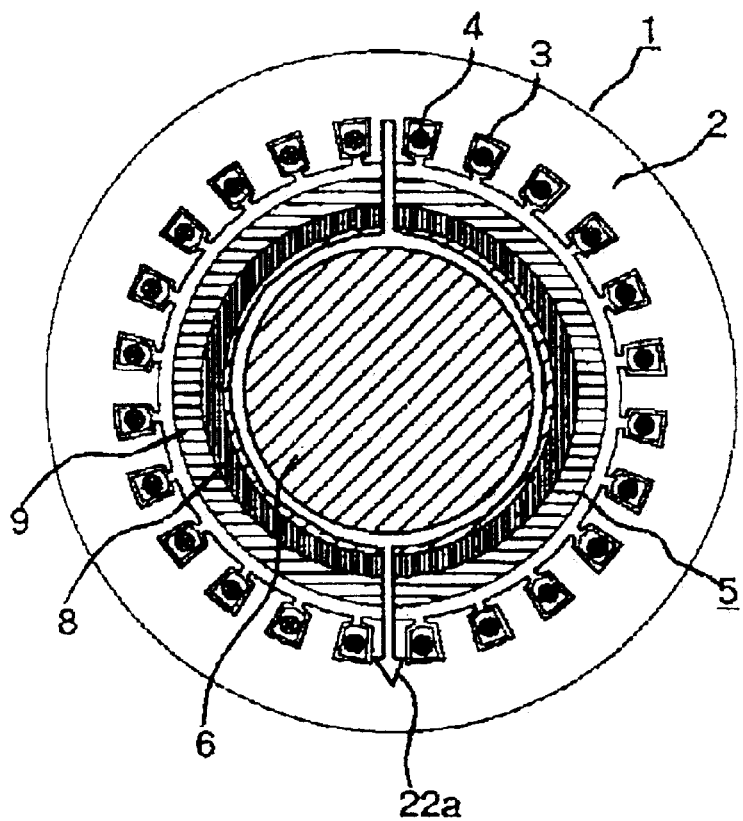
FIG. 4a is a radially sectional view illustrating a conventional permanent magnet type synchronous motor, for showing a flow of magnetic flux.
Figure 4B:
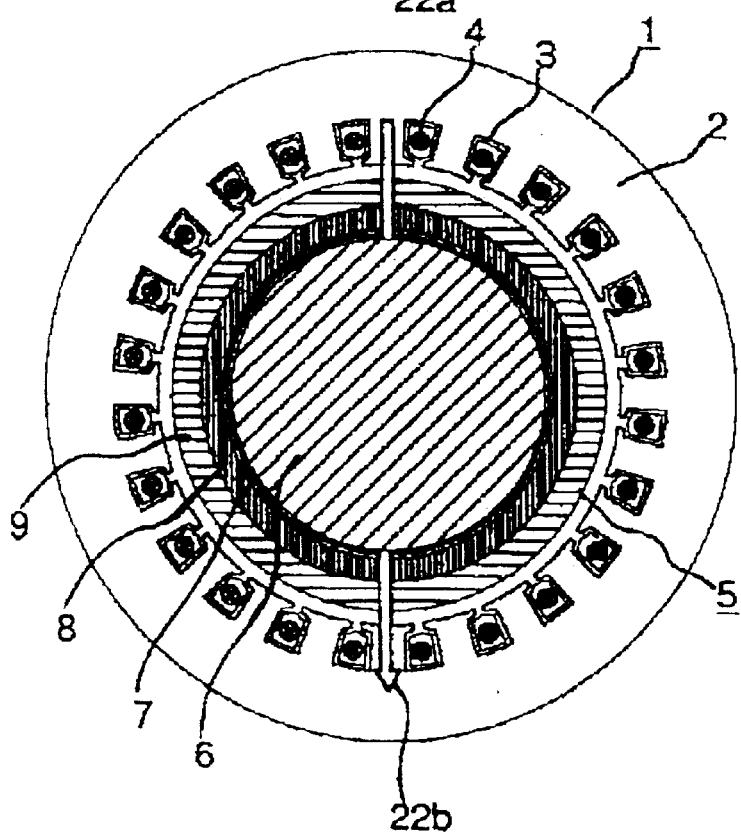
FIG. 4b is a radially sectional view illustrating the permanent magnet type synchronous motor shown in FIG. 1.

Referring to FIGS. 4a and 4b which show a flow pattern of reaction magnetic flux of the armature in the arrangement according to the present invention, shown in FIGS. 1 and 2, and in which like reference numerals are used to denote like parts shown in FIGS. 1 and 2, and accordingly, explanation thereto will be omitted, except that the direction of current in the armature windings 4 and the directions 22a, 22b of the reaction magnetic flux 22 in the armature. Further, FIG. 4a shows the flow of reaction magnetic flux 22a in the armature when no laminated electromagnetic steel sheet is provided to the shaft 6. The permanent magnet type synchronous motor 1 according to the present invention is a super-high speed motor having a speed higher than 40,000 rpm with a fundamental frequency of 667 Hz. In such a case that the super-high speed permanent magnet type synchronous motor 1 is driven by the inverter, since switching operation is inevitable in order to obtain an arbitrary a.c. voltage-current waveform from a d.c. voltage, 5-order, 7-order, 11-order, 13-order, 17-order, 19-order harmonic currents having frequency which are as 5, 7, 11 ... times as high as the fundamental frequency are inevitably superposed. Since the rotor is rotated at the fundamental frequency, no loss is caused in the rotor with the fundamental frequency. However, harmonic components subsequent to 5-order harmonic component are rotated asynchronously with respect to the rotor, and accordingly, loss is caused in the rotor by the harmonic current components. If a neodymium magnet is used, since it is itself conductive, excessive loss would be usually caused in the magnet. In order to grasp loss caused in the rotor, there were prepared a rotor with CFRP (composed of a CFRP, a permanent magnet and a shaft), a rotor without CFRP (composed of permanent magnets and a shaft) and a shaft rotor (composed of a shaft), and experiments were made with the use of them in order to obtain losses caused by these harmonic currents. It was resulted that the total loss becomes as high as several kW. It was found that of the total loss, 10% was caused by the permanent magnets and the remainder of 90% was caused by the shaft but no loss is caused by the CFRP. This loss is the sum of those caused by 5-order, 7-order, 11-order, 13-order, 17-order and 19-order harmonic currents.

The results of the experiments was analyzed in order to understand the reason why the loss by the shaft is large. As shown in FIG. FIG. 4a, in the case of a two-pole motor, the harmonic armature reaction magnetic flux 22a comes out from the stator core 2 and then goes into the shaft 6 by way of the permanent magnet 8. Thereafter, it goes through the outer surface (a thin layer having a thickness of about 0.5 mm on the outer surface of the shaft 6, due to the harmonic waves) of the shaft 6, and it returns to the stator core 2 after again passing through the permanent magnet and the CFRP 9. That is, magnetic flux is concentrated only to the outer surface of the shaft 6 so that excessively large eddy current flows therethrough. Thus, it was found that 90% of the total loss was caused by the shaft 6. On the contrary, as shown in FIG. 4b, in the case of the provision of the laminated electromagnetic steel sheet 7 around the outer periphery of the shaft 6, although it might be considered that the harmonic armature reaction magnetic flux 22b runs through the electromagnetic steel sheet 7 and enters into the shaft, the results of the experiments exhibited that the harmonic armature reaction magnetic flux 22b bypasses the shaft 6 after turns through the electromagnetic steel sheet 7, and accordingly, the total loss caused by the rotor 5 was composed of only 10% by the permanent magnets 8 together with iron loss of the electromagnetic sheet 7. Thus, the total loss of the rotor 5 can be reduced to several kW, and accordingly, a super-high speed permanent magnet type synchronous motor becomes available. As a result, the temperature rise of the permanent magnets 8 can be alleviated, and accordingly, desired magnetic flux can be obtained while the volume of the above-mentioned cooling air can be reduced. Thus, there can be effected such an advantage that an air compressor with energy saving is available.

Explanation has been made of such a case that the laminated electromagnetic steel sheet 7 is used in the super-high speed permanent magnetic type synchronous motor having a speed higher than 40,000 rpm, according to the present invention.

Figure 5:
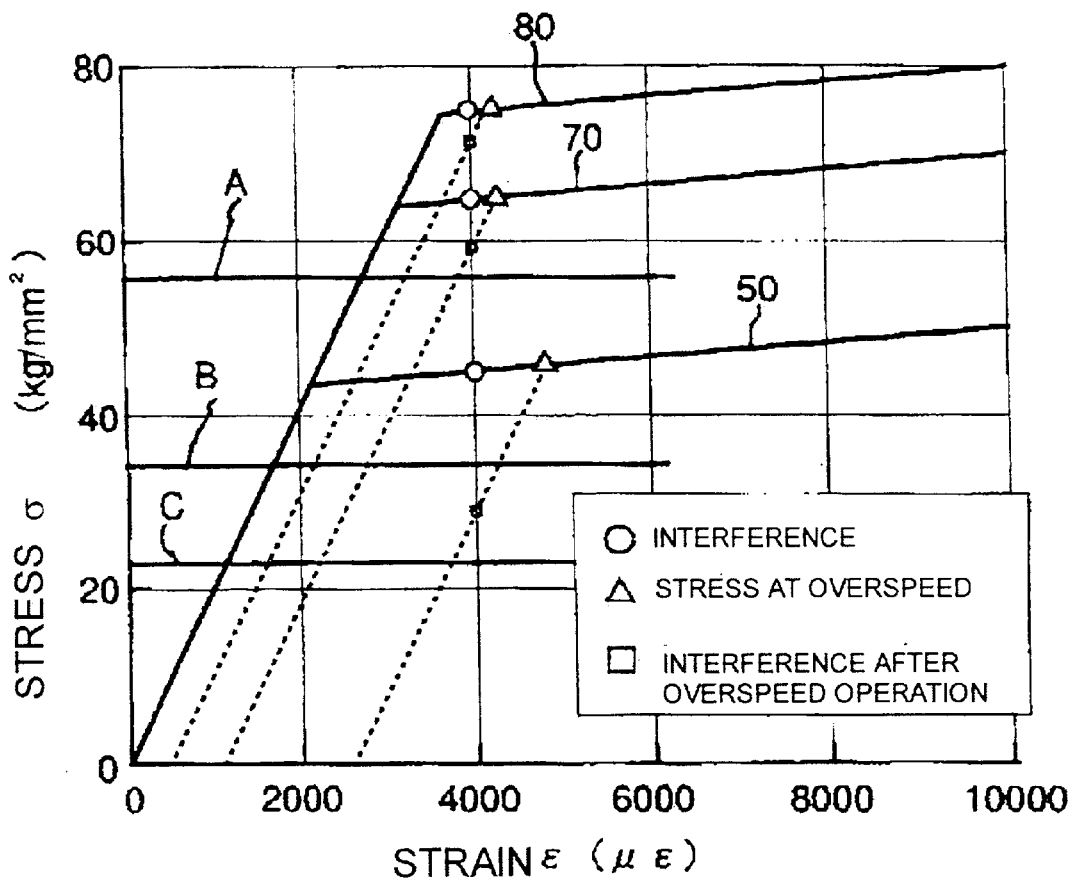
FIG. 5 is a graph exhibiting the mechanical strength of the permanent magnet type synchronous motor shown in FIG. 1.

Referring to FIG. 5 which shows the mechanical strength of the permanent magnet type synchronous motor in this embodiment of the present invention, that is, the strain-stress variation of the electromagnetic steel sheet, the strain is taken on the abscissa while the stress is taken on the ordinate, and there are shown the strain-stress characteristics of electromagnetic steel sheets respectively having mechanical strengths of 50 kg/mm$^2$, 70 kg/mm$^2$ and 80 kg/mm$^2$. In the figure, white round marks ○ denote an initial interference, white triangular marks Δ denote stress during over-speed rotation, and white square marks □ denote interference after over-speed operation. Further, there are shown a maximum centrifugal stress A, an intermediate centrifugal stress B and a minimum centrifugal stress C. If an electro magnetic steel sheet having a tensile stress of 50 kg/mm$^2$ is used, when an initial interference having a strain of 400 ($\mu e$) is applied to this electromagnetic steel sheet (○ mark), the electromagnetic steel sheet plastically deforms, exceeding the elastic deformation limit, and upon over-speed operation, a stress indicated by Δ mark is added. When the operation is stopped, the stress decreases with the same inclination as that of elastic deformation. In this case, if the centrifugal force is effected as indicated by the mark C, the residual interference □ exceeds the centrifugal force C, and accordingly, the electromagnetic steel sheet never separates from the intermediate sleeve 10. However, when the centrifugal force B is applied by increasing the rotational speed, the interference □ becomes lower than the centrifugal force B, and accordingly, during rotation in this condition, the electromagnetic steel sheet separates from the intermediate sleeve, and accordingly, no torque can be transmitted to the shaft 6, that is, the super-high speed permanent magnet type synchronous motor 1 is not available. Meanwhile, with the use of an electromagnetic steel sheet having a tensile strength of 70 kg/mm$^2$, when an initial interference of a strain of 400 ($\mu e$) is applied to the electromagnetic steel sheet (○ mark), the electromagnetic steel sheet plastically deforms, exceeding the elastic deformation limit. Upon over-speed operation, a stress indicated by Δ mark is applied. Further, when the operation is stopped, the stress decreases with the same inclination as that upon the elastic deformation. In this case, since the residual interference □ exceeds the maximum centrifugal stress A even though the centrifugal stress having the maximum value A is applied, the electromagnetic steel sheet does never separate from the intermediate sleeve 10 even during rotation. Accordingly, the torque can be transmitted to the shaft 6. Since electromagnetic steel sheets which are commercially available has a maximum tensile strength of 55 kg/mm$^2$, it cannot bear against the maximum centrifugal force. However, with the use of a high tensile strength electromagnetic steel sheet (which has a strength higher than the maximum strength of usual electromagnetic steel sheets), the tensile strength thereof exceeds 70 kg/mm$^2$, it can bear against the maximum centrifugal force. Further, if an electromagnetic steel sheet having a tensile strength of 80 kg/mm$^2$ is used, the safety factor against the centrifugal stress can be increased. It has been confirmed through various experiments that a super-high speed permanent magnet type synchronous motor is available by using a high electromagnetic steel having a tensile strength higher than 70 kg/mm$^2$ is used for the laminated electromagnetic steel sheet 7.

Figure 6:
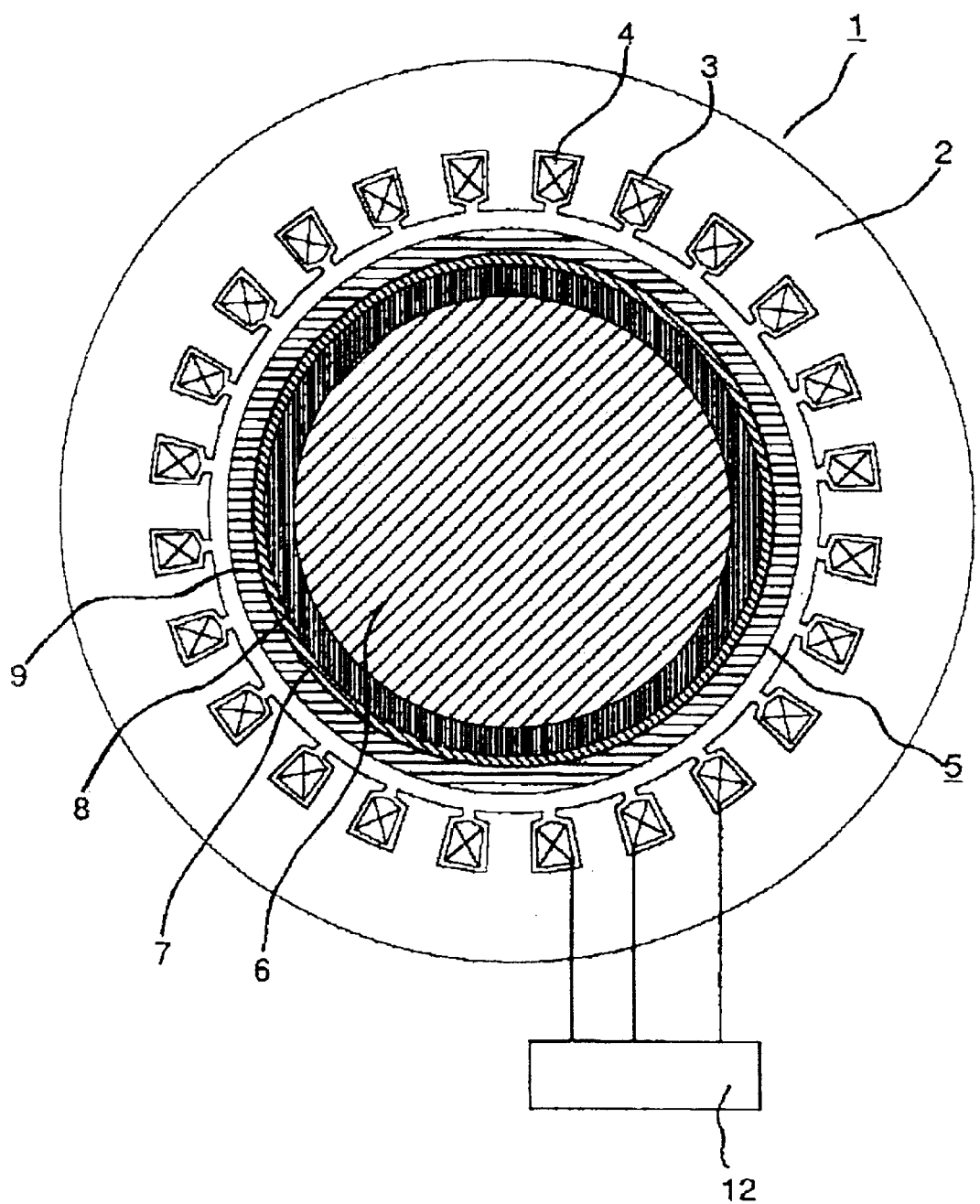
FIG. 6 is a radially sectional view illustrating a permanent magnet type synchronous motor in another embodiment of the present invention.

Referring to FIG. 6 which is a radially sectional view illustrating a permanent magnet type synchronous motor in another embodiment of the present invention, similar to the permanent magnet type synchronous motor shown in FIG. 1, except that the laminated electromagnetic steel sheet 7 is provided not only around the outer periphery of the shaft but also around the outer peripheries of the permanent magnet 8. With this arrangement, the total loss caused by the rotor 5 can be further reduced.

It is noted that the so-called super-high speed permanent magnet type synchronous motor is the one which can operates at a high speed in a range of 40,000 to 80,00 rpm, and accordingly, the fundamental frequency falls in a range from 667 to 1,333 Hz.

In this embodiment of the present invention, the fundamental frequency is considered to be around 1 kHz in general.

Further, in this embodiment of the present invention, it is desirable to axially split a ring-like permanent magnet in view of reduction of the loss since the loss by the permanent magnet occupies 10% of the total loss.

As has been detailed in the above, with the provision of the laminated electromagnetic steel sheet between the shaft and the permanent magnets, harmonic magnetic flux passes through the laminated electromagnetic steel sheet and bypasses the shaft, the shaft does not cause any loss, and accordingly, the loss of the rotor can be reduced to several hundreds W. Further, in the permanent magnet type synchronous motor for directly driving an air compressor, in which the rotor is rotated at a peripheral speed which is as high as several hundreds m/s, should the laminated electromagnetic steel sheet be provided in the rotor, there would be caused such a disadvantage that the rotor deforms due to an elongation under centrifugal force. On the contrary, with the use of a high tensile strength electromagnetic steel sheet having a tensile strength of 70 kg/mm$^2$, no deformation caused by elongation of the laminated electromagnetic steel sheet is present, and accordingly, a super-high speed permanent magnet type synchronous motor and an air compressor using thereof are available.

Thus, it goes without saying that the present invention can provide a super-high speed permanent magnet type synchronous motor and an air compressor using thereof.

What is claimed is:

1. A permanent magnet synchronous motor comprising a stator in which armature windings are wound in a plurality of slots formed in a stator core, and a rotor composed of a shaft having an outer periphery and made of a conductive magnetic material, an intermediate sleeve having an outer periphery, made of the same material as that of the shaft and laid around the outer periphery of the shaft, a laminated electromagnetic steel sheet having a high tensile strength, laid around the outer periphery of the intermediate sleeve and having an outer periphery, a conductive permanent magnet having an outer periphery and laid around the outer periphery of the laminated electromagnetic steel sheet, and a reinforce member made of conductive carbon fibers and laid around the outer periphery of the permanent magnet, wherein harmonic magnetic flux detours the laminated electromagnetic steel sheet so as to reduce loss caused by the harmonic magnetic flux in the intermediate sleeve.

2. A permanent magnet synchronous motor as set forth in claim 1, wherein the permanent magnet comprises a ring-like permanent magnet split in an axial direction.

3. A permanent magnet synchronous motor as set forth in claim 1, wherein the permanent magnet has two magnet poles.

4. A permanent magnet synchronous motor as set forth in claim 1, wherein the laminated steel sheet has a tensile strength higher than 70 kg/mm$^2$.

5. A permanent magnet synchronous motor as set forth in claim 4, wherein the permanent magnet comprises a ring-like permanent magnet split in an axial direction.

6. A permanent magnet synchronous motor as set forth in claim 4, wherein the permanent magnet has two magnet poles.

7. permanent magnet synchronous motor comprising a stator in which armature windings are wound in a plurality of slots formed in a stator core, and a rotor composed of a shaft having an outer periphery and made of a conductive magnetic material, an intermediate sleeve having an outer periphery, made of the same material as that of the shaft and laid around the outer periphery of the shaft, a conductive permanent magnet having an outer periphery and laid around the outer periphery of the intermediate sleeve, a laminated electromagnetic steel sheet having a high tensile strength, laid around the outer periphery of the permanent magnet, and having an outer periphery, and a reinforce member made of conductive carbon fibers and laid around the outer periphery of the laminated electromagnetic steel sheet, wherein harmonic magnetic flux detours the laminated electromagnet steel sheet so as to reduce loss caused by the harmonic magnetic flux in the intermediate sleeve.

8. A permanent magnet synchronous motor as set forth in claim 7, wherein the permanent magnet comprises a ring-like permanent magnet split in the axial direction.

9. A permanent magnet synchronous motor as set forth in claim 7, wherein the permanent magnet has two magnet poles.

10. A permanent magnet synchronous motor as set forth in claim 7, wherein the laminated steel sheet has a tensile strength higher than 70 kg/mm$^2$.

11. A permanent magnet synchronous motor as set forth in claim 10, wherein the permanent magnet comprises a ring-like permanent magnet split in the axial direction.

12. A permanent magnet synchronous motor as set forth in claim 10, wherein the permanent magnet has two magnet poles.

13. An air compressor comprising a magnet synchronous motor composed of a stator, a rotor having a shaft made of a conductive magnetic material, a first and a second compression stage each having an impeller and provided on opposite end sides of the shaft of the rotor, and an intermediate cooler between the first and the second compression stage, the rotor comprising the shaft having an outer periphery and made of a conductive magnetic material, an intermediate sleeve having an outer periphery, made of the same material as that of the shaft and laid around the outer periphery of the shaft, a laminated electromagnetic steel sheet having a high tensile strength, laid around the outer periphery of the intermediate sleeve and having an outer periphery, a conductive permanent magnet having an outer periphery and laid around the outer periphery of the laminated electromagnetic steel sheet, and a reinforce member made of conductive carbon fibers and laid around the outer periphery of the permanent magnet, wherein harmonic magnetic flux detours the laminated electromagnet steel sheet so as to reduce loss caused by the harmonic magnet flux in the intermediate sleeve.

14. An air compressor as set forth in claim 13, wherein the permanent magnet comprises a ring-like permanent magnet split in the axial direction of the shaft.

15. An air compressor as set forth in claim 14, wherein the permanent magnet comprises a ring-like permanent magnet split in the axial direction of the shaft.

16. An air compressor as set forth in claim 14, wherein the permanent magnet has two magnetic poles.

17. An air compressor as set forth in claim 13, wherein the permanent magnet has two magnet poles.

18. An air compressor as set forth in claim 13, wherein the laminated electromagnetic sheet has a tensile strength higher than 70 kg/mm$^2$.

19. An air compressor comprising a magnet synchronous motor composed of a stator, a rotor having a shaft made of a conductive magnetic material, a first and a second compression stage each having an impeller and provided on opposite end sides of the shaft of the rotor, and an intermediate cooler between the first and the second compression stage, the rotor comprising the shaft having an outer periphery, an intermediate sleeve having an outer periphery, made of the same material as that of the shaft and laid around the outer periphery of the shaft, a conductive permanent magnet having an outer periphery and laid around the outer periphery of the intermediate sleeve, a laminated electromagnetic steel sheet having a high tensile strength, laid around the outer periphery of the permanent magnet, and having an outer periphery, and a reinforce member made of conductive carbon fibers and laid around the outer periphery of the laminated electromagnetic steel sheet, wherein harmonic magnetic flux detours the laminated electromagnet steel sheet so as to reduce loss caused by the harmonic magnet flux in the intermediate sleeve.

20. An air compressor as set forth in claim 19, wherein the permanent magnet comprises a ring-like permanent magnet split in the axial direction of the shaft.

21. An air compressor as set forth in claim 20, wherein the laminated electromagnetic sheet has a tensile strength higher than 70 kg/mm$^2$.

22. An air compressor as set forth in claim 20, wherein the permanent magnet comprises a ring-like permanent magnet split in the axial direction of the shaft.

23. An air compressor as set forth in claim 20, wherein the permanent magnet has two magnetic poles.

24. An air compressor as set forth in claim 19, wherein the permanent magnet has two magnetic poles.

* * * * *